United States Patent [19]

Morris et al.

[11] Patent Number: 4,790,259
[45] Date of Patent: Dec. 13, 1988

[54] TOOL FOR ROBOTIC APPLICATION OF LIQUID TO A WORK SURFACE

[75] Inventors: James R. Morris, Davenport, Iowa; Douglas K. Boyd, Colona, Ill.

[73] Assignee: Genesis Systems Group, Ltd., Davenport, Iowa

[21] Appl. No.: 162,137

[22] Filed: Feb. 29, 1988

[51] Int. Cl.[4] .............................................. B05C 1/02
[52] U.S. Cl. ................................. 118/707; 118/711; 118/266
[58] Field of Search ............... 118/710, 711, 707, 668, 118/669, 266, 267

[56] References Cited

U.S. PATENT DOCUMENTS 2,823,633 2/1958 Meier et al. ..................... 118/267 X
4,605,569 8/1986 Shimada et al. ................ 118/697 X Primary Examiner—John McIntosh
Attorney, Agent, or Firm—Zarley, McKee, Thomte, Voorhees & Sease

[57] ABSTRACT

The tool of the present invention includes a compliance guide having a cylindrical vertical bore extending therethrough. Slidably mounted within the bore is a tool holder which is free to slide vertically, but which is held against lateral movement within the bore. Attached to the tool holder is a tool having a dauber pad at its lower end. A nipple is threaded within a vertical bore in the tool holder and extends upwardly therefrom through an aperture in a closure plate which fits over the upper end of the vertical bore in the compliance guide. A nut is threaded over the nipple above the closure plate and a spring below the closure plate yieldably urges the nipple and the tool holder downwardly until the nut engages the closure plate. Fluid is introduced through the nipple and extends downwardly to the dauber pad which absorbs the liquid and applies it to the work surface. A check valve is mounted within the dauber pad to prevent the dauber pad from receiving fluid until the dauber pad engages the work surface.

10 Claims, 2 Drawing Sheets

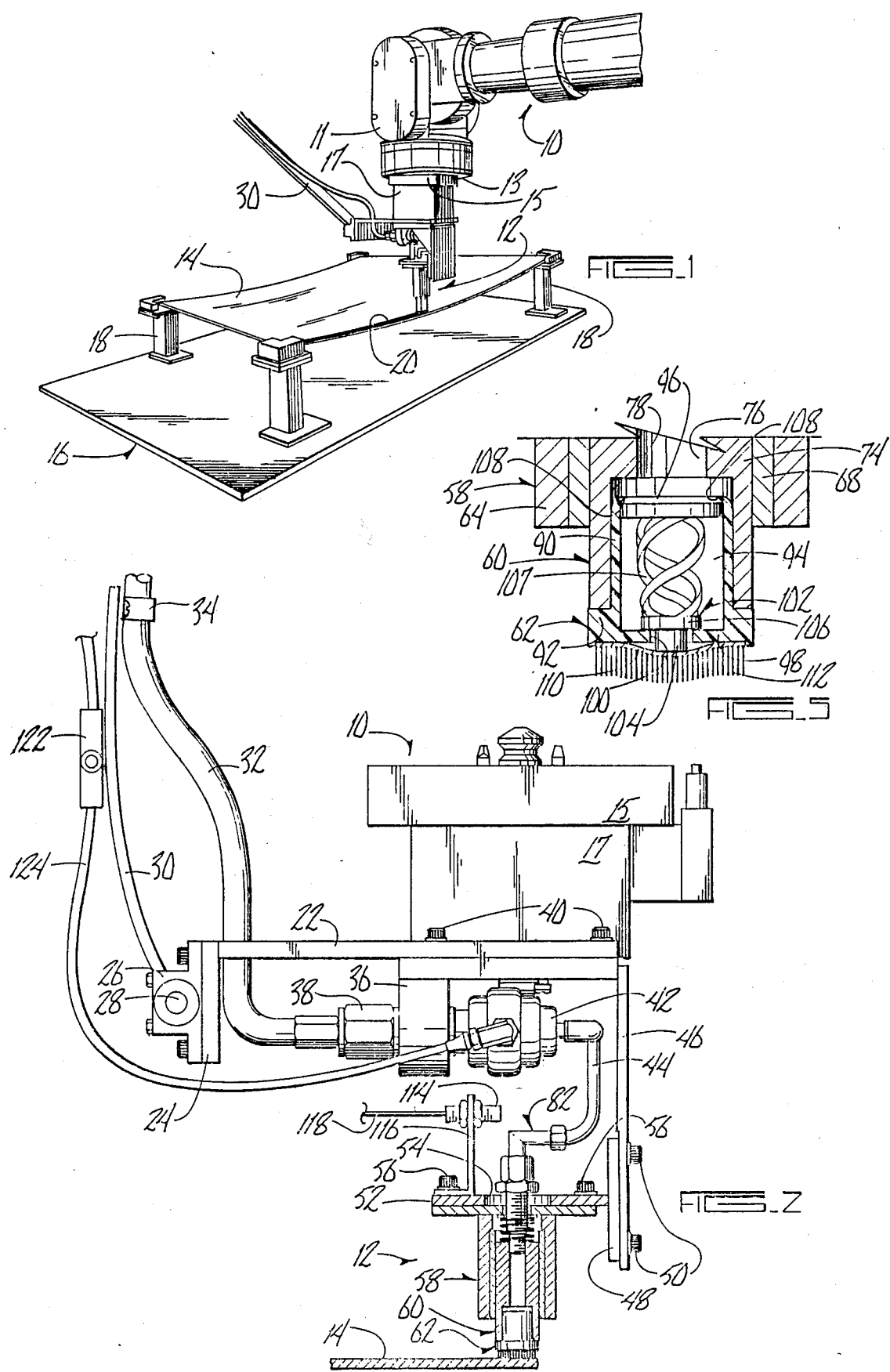

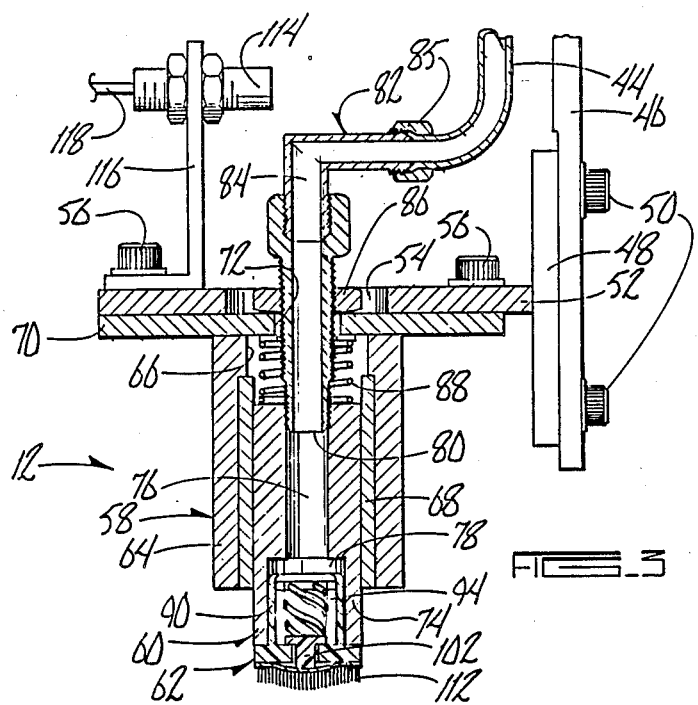
FIG_3
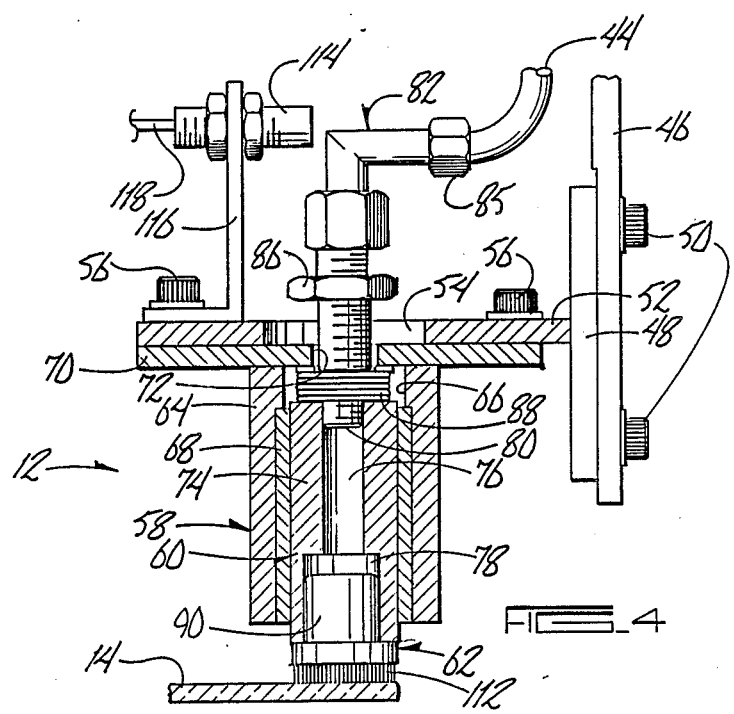
FIG_4

TOOL FOR ROBOTIC APPLICATION OF LIQUID TO A WORK SURFACE

BACKGROUND OF THE INVENTION

The present invention relates to a tool adapted to be attached to a robot assembly for the robotic application of liquid to a work surface.

Robots have been utilized for the robotic application of liquids such as paint or paint primers to work surfaces. A typical example is the application of primer to the edge of a windshield glass used in the construction of vehicles.

The robotic application of fluid to the work surface in these situations involves several problems. It is often difficult to position the tool accurately with respect to the work surface, particularly when the work surface is irregular in all three dimensions. For example, a windshield glass is irregular in a horizontal plane, but also is irregular in a vertical direction.

Another problem with tools for applying paint or liquid to a work surface is the ability to maintain constant film thickness across the length of the bead of primer that is being provided by the tool.

It is also important that the tool be easily maintained and that dripping be held to a minimum.

Therefore, a primary object of the present invention is the provision of an improved tool guide which is attachable to a robot for the application of liquid to a work surface.

Another object of the present invention is the provision of a tool holder which holds the tool in precise and constant location with respect to the robot which moves the tool.

A further object of the present invention is the provision of an improved dauber device with a built-in check valve which prevents the introduction of fluid to the dauber when the tool is not in use.

A further object of the present invention is the provision of a tool which applies a very uniform thin layer of primer to the work surface.

A further object of the present invention is the provision of a tool which is positively held by the robot and which maintains the accuracy of the location of the film to very close tolerances.

A further object of the present invention is the provision of a device which is economical to manufacture, durable in use and efficient in operation.

A further object of the present invention is the provision of a tool holder which includes a safety shut-off device for shutting off the robot in the event that the tool moves beyond a predetermined limit.

SUMMARY OF THE INVENTION

The too holder of the present invention includes a compliance guide which is adapted to be attached to a robot capable of moving the compliance guide in a plurality of directions in all three dimensions. The compliance guide includes a housing having an elongated cylindrical bore extending therethrough and having an open lower end, an open upper end, and a closure plate extending over the open upper end of the bore. The closure plate includes an opening therein. A holder body is slidably fitted within the bore of the compliance guide for vertical sliding movement upwardly and downwardly. A passageway extends through the holder and the lower end of the passageway is placed in communication with an applicator which is attached to the lower end of the holder body. The applicator includes an absorbent pad adapted to receive liquid and apply the liquid to the work surface.

The upper end of the holder body has a nipple threadably inserted therein. The nipple includes a vertical passageway therein, and extends upwardly through the aperture in the closure plate of the compliance guide to an upper nipple end which is connected to a source of liquid or fluid to be applied to the work surface. Threaded on the upper end of the nipple is a nut which is adapted to engage the closure plate to limit downward movement of the nipple. A spring within the bore of the compliance guide yieldably urges the nipple and the holder downwardly to its lowermost position wherein the nut engages the upper surface of the closure plate.

Within the applicator is a cavity which is in communication with the vertical passageway of the holder body. The lower end of the cavity includes an outlet opening therein which leads to the absorbent pad mounted on the lower end of the applicator. A check valve is mounted within the outlet opening and is normally held in a closed position preventing fluid from passing from the cavity to the absorbent pad. However, when the absorbent pad is pressed downwardly against the work surface, the check valve is responsive to this pressure and opens to permit fluid to pass to the absorbent pad so that the fluid can be applied to the work surface.

A safety switch is mounted above the nipple and includes a magnetic sensor which is positioned to be adjacent the nipple when the nipple is in its uppermost position. The magnetic sensor senses that the nipple is in its uppermost position, and communicates this fact through electronic circuitry to the robot for shutting off the robot. Thus, when undue pressure is applied between the absorbent pad and the work surface, the nipple is forced upwardly to its uppermost position, and in this position the sensor causes the robot to be shut off.

BRIEF DESCRIPTION OF THE DRAWINGS

FIG. 1 is a perspective view of the present invention mounted on the end of the arm of a robot.

FIG. 2 is an elevational view of the present invention showing portions thereof in section.

FIG. 3 is an enlarged sectional view of the present invention.

FIG. 4 is a view similar to FIG. 3, but showing the holder and nipple in their uppermost position.

FIG. 5 is an enlarged sectional view showing the internal structure of the applicator of the present invention.

DETAILED DESCRIPTION OF THE PREFERRED EMBODIMENT

Referring to the drawings, the numeral 10 generally refers to a robot arm which is shown holding a tool 12 of the present invention. Tool 12 is shown in engagement with a glass windshield 14 which is mounted upon a jig or holder 16 having four pedestals 18 for holding the four corners of windshield 14. Tool 12 is used to apply a bead 20 of primer to the perimeter of windshield 14. Windshield 14 is not flat and does not lie in a single plane, but instead, includes a curved surface. Also, the perimeter of windshield 14 is not absolutely straight, but is often irregular in shape. It is therefore important that tool 12 be capable of movement in solid positive contact with the upper surface of windshield 14 throughout the various changes in direction of the upper plane surface of windshield 14. Tool 12 must also be held positively so as to minimize lateral movement of the tool throughout the movement around the perimeter of windshield 14. This permits the tool 12 to accurately position the bead 20 of primer or other fluid on the windshield 14.

Robot arm 10 is controlled by a computer program so as to move the tool 12 accurately around the perimeter of windshield 14. The program causes the arm 10 to move the tool in a horizontal plane (in the X direction and Y direction) and in a vertical plane (the Z direction). However, the number of points which must be plotted to determine the path of tool 12 can be reduced if the tool 12 is capable of moving vertically in the Z direction. At the same time, it is important that the tool 12 be held positively against lateral movement in the X and Y direction so as to insure accurate positioning of the tool 12 relative to the windshield 14.

Robot arm 10 includes a robot wrist 11 which is connected to an air operated chuck 13 having a tooling adapter plate 15 and a spacer block 17 connected therebelow. Referring to FIG. 2, the lower end of spacer block 17 is provided with a horizontal mounting flange 22 having a vertical mounting flange 24 fixed to one end thereof. Attached to vertical flange 24 is a pillow block 26 which rotatably receives a shaft 28 to which a strap 30 is fixed. Strap 30 is free to pivot about the axis provided by shaft 28. Attached to strap 30 is a flexible primer tube 32 which is held to strap 30 by means of a clamp 34. The pivotal movement of strap 30 provides flexibility to the flexible tube 32 throughout movement of the robot arm while at the same time the strap 30 holds the tube 32 away from the robot arm 10 so that it does not become entangled therewith.

Mounted to the undersurface of horizontal mounting flange 22 is a bracket 36 having a coupling nut 38 adapted to be coupled to the end of tube 32. Bracket 36 is held to plate 22 by means of nuts 40. Also connected to bracket 36 is a recirculating flow valve 42 which is adapted to receive fluid from tube 32. An example of a preferred valve for this function is manufactured by Jesco Products Company, 24343 Gibson Drive, Warren, Michigan 48089 under the model designation N-351-AV-W. The purpose of valve 42 is to allow the primer to constantly recirculate through the primer supply tubing to prevent settling and eventual clogging. Valve 42 also acts as the flow control valve for the applicator tip of the present invention.

Connected to the valve 42 is a segment of moisture resistant tubing 44. Since the primer used for the present invention often cures quickly in the presence of moisture, it is very important to use only moisture resistant tubing. Moisture resistant tubing of this type is available commercially utilizing a Teflon ® coated inner diameter.

Bracket 36 includes a downwardly extending arm 46 having a mounting flange 48 attached thereto by means of nuts 50. Mounting flange 48 includes a horizontal mounting plate 52 which has a vertical circular opening 54 therein. Tool 12 is mounted to the undersurface of plate 52 by means of nuts 56.

Tool 12 comprises a compliance guide 58, an appliance holder 60, and a dauber appliance 62. Compliance guide 58 comprises a barrel 64 having a longitudinal vertical bore 66 therein. Fitted within bore 66 is a bushing 68 which provides a smooth continuous inner surface for receiving the appliance holder 60. Across the upper end of bore 66 is a closure plate 70 having an aperture 72 centrally located with respect to the longitudinal axis of bore 66.

Appliance holder 60 includes a holder body 74 which is sized to fit within bushing 68 and slide vertically upwardly and downwardly with respect thereto. Body 74 includes a central passageway 76 extending vertically therethrough. At the lower end of passageway 76 is an enlarged counter-bore 78 into which dauber appliance 62 is press fitted.

Threaded into the upper end of passageway 76 is the lower end 80 of a nipple 82. Extending upwardly through nipple 82 is a nipple passageway 84. Nipple 82 extends upwardly through aperture 72 and circular opening 54, and includes on its upper end a coupling nut 85 for connecting nipple 82 to the flexible tubing 44 for receiving primer therefrom. The primer passes downwardly through passageway 84 where it is introduced into passageway 76 of holder body 74. Threaded on the outer surface of nipple 82 is a stop nut 86 which is sufficiently large to engage the closure plate 70 as the nipple 82 moves downwardly, thereby limiting the downward movement of nipple 82. Nut 86 may be threaded upwardly or downwardly along the length of nipple 82 so as to adjust the lowermost position of nipple 82 relative to the closure plate 70. Because nipple 82 is threaded within the holder body 74, the holder body 74 and the nipple 82 move in unison with one another. A coil spring 88 is positioned between closure plate 70 and holder body 74 so as to yieldably urge the nipple 82 and the holder body 74 to their lowermost position which is shown in FIG. 3.

Referring to FIG. 5, the dauber appliance 62 includes an upper cylindrical housing 90 which is press fitted within counterbore 78 of holder body 74. At the lower end of appliance body 62 is an annular flange 92 which engages the lower end of holder body 74. Upper cylindrical housing 90 forms a cavity 94 which is in communication with passageway 76 and counterbore 78 by virtue of an inlet opening 96 therein. The lower end of cavity 94 includes a bottom wall 98 having an outlet opening 100 therein. Fitted within outlet opening 100 is a check valve 102 having a valve stem 104 protruding within outlet opening 100 and having an enlarged valve head 106 which is larger than outlet opening 100. Attached to and integral with valve head 106 is a coil spring 107 which extends upwardly and which engages the inwardly extending lips 108 of the cylindrical housing 90. Valve stem 104 extends downwardly below the bottom wall 98 and engages the backing 110 of an absorbent pad 112. Both pad 112 and its backing 110 are made of a liquid absorbing material.

The spring 107 normally urges valve head 106 tightly against the bottom wall 98 so as to close outlet opening 100. However, upward pressure on the absorbent pad 112 causes valve stem 104 to urge valve head upwardly against spring 107 so as to open the outlet opening 100 and permit liquid to pass from cavity 94 through opening 100 to the absorbent pad 112, which quickly absorbs the liquid. As soon as the tool is lifted upwardly from the work surface, the spring 107 urges check valve 102 to its closed position as shown in FIG. 5, thereby cutting off the flow of liquid to the absorbent pad 112.

A safety switch 114 (FIG. 3) is mounted to the upper surface of horizontal mounting plate 52 by means of a bracket 116. Safety switch 114 is connected by means of an electrical lead wire 118 to the control system of robot arm 10. Switch 114 is adapted to sense the presence of the elbow 120 when the nipple 82 is in its extreme upper position a shown in FIG. 4. Nipple 82 is formed of metal, and switch 114 includes a magnetic sensor which senses the proximity of elbow 120 and causes a signal to be sent through lead wire 118 to cause the robot arm 10 to be shut down. This provides a safety mechanism in the event that undue pressure is encountered between the work surface 14 and the applicator 62.

Referring to FIG. 2, a manual control 122 is attached to strap 30 and is in communication with a pneumtic tube 124 which is connected at its lower end to recirculation control valve 42. Manual control valve 122 permits the manual opening of recirculating control valve 42 so that the computer controls for valve 42 can be overridden manually.

In operation, the manual control valve 122 is firs actuated to open recirculating control valve 42 and permit fluid to flow downwardly through flexible tube 44, nipple 82, holder body 74, into dauber appliance 62. A piece of cardboard or the like is manually pressed against the bottom of absorbent pad 112 so as to open the check valve 102 and permit liquid to gain access to the absorbent pad 112.

The manual valve 122 is then shut off, and the computer program for controlling the movement of arm 10 is actuated so as to move arm 10 in a predetermined path which will place the tool 12 in contact with the perimeter of windshield 14 and will move the tool 12 around the perimeter of windshield 14.

As the tool 12 is moved downwardly, the absorbent pad 112 engages the edge of the windshield 14 and causes check valve 102 to open and provide fluid to the absorbent pad 112. Further downward movement of the robot arm permits the holder body to slide upwardly within the compliance guide 58 against the bias of spring 88. However, the compliance guide 58 positively holds the holder body 60 against lateral movement with respect to compliance guide 58. Therefore, the only movement permitted by the dauber appliance 62 relative to the compliance guide 58 is vertical upward movement in the Z direction relative to the robot arm 10.

In the event that a foreign object is placed between the tool and the work surface, the holder body 60 and the nipple 82 are forced upwardly to the point where elbow 120 of nipple 82 is in the proximity of safety switch 114. Safety switch 114 senses the presence of elbow 120 and shuts down the robot system so as to protect against breakage or other harm to the work surface or to the robot. However, a limited amount of vertical movement of the dauber appliance 62 is permitted by virtue of the slidable mounting of holder body 74 and nipple 82 with respect to the compliance guide 58.

The present tool provides a very uniform thin layer of primer on the outer edge of the windshied 14. This results in an improved product because the primer is properly located and is at the required thickness. Material waste is eliminated and substantial accuracy of the positioning of the dauber appliance 62 is attained. Accuracy of the total programmed robot path has been found to be within a tolerance of 0.010 inches.

Thus, it can be seen that the device accomplishes at least all of its stated objectives.

What is claimed is:

1. A tool adapted to be attached to a robot assembly for the robotic application of liquid to a work surface comprising:

a compliance guide comprising a compliance housing having an elongated cylindrical bore extending therethrough and having an open upper bore end and an open lower bore end, closure means partially blocking said open upper end and having an opening therein which is smaller than the cross-sectional size of said bore;

connecting means for connecting said compliance guide to said robot;

an applicator holder body having upper and lower ends and being slidably fitted within said cylindrical bore of said compliance guide for reciprocating sliding movement within said bore, said holder body having an elongated passageway extending therethrough and having an upper passageway end and a lower passageway end;

nipple means having a lower end attached to said holder body and extending upwardly therefrom through said opening in said closure means to an upper end located outside said bore of said compliance guide, said nipple means having a nipple bore extending therethrough and providing communication from outside said bore of said compliance guide to said upper passageway end of said holder body, said nipple means being slidable within said opening and being movable in unison with said holder body when said holder body slides within said bore of said compliance guide;

connecting means on said upper end of said nipple means for connecting said nipple bore in communication with a source of said liquid; stop means on said nipple means above said closure member for limiting downward movement of said nipple and said holder body beyond a predetermined lower position relative to said compliance guide;

spring means between said holder body and said closure member for yieldably urging said holder body and said nipple means toward said lower position:

applicator means attached to said application holder body and being in liquid communication with said lower passageway end of said holder body for receiving said liquid therefrom, said applicator means being adapted for engaging said work surface and applying said liquid to said work surface.

2. A tool according to claim 1 wherein said applicator means comprises an applicator housing having a cavity therein in liquid communication with said lower passageway end of said holder body, said applicator housing having an aperture therein providing liquid communication between said cavity and the exterior of said applicator housing, a liquid absorbent member attached to said applicator housing in covering relation over said aperture for receiving and absorbing liquid therefrom.

3. A tool according to claim 2 comprising check valve means within said aperture and normally being in a closed position closing said aperture, said check valve means being yieldably movable to an open position permitting liquid to pass through said aperture in response to the compression of said absorbent member between said housing and said work surface.

4. A tool according to claim 3 comprising valve spring means within said cavity of said applicator housing and engaging said check valve means for yieldably urging said check valve means to said closed position.

5. A tool according to claim 1 and further comprising sensing means connected to said compliance guide and positioned above said closure means adjacent said nipple means, said sensing means being capable of sensing movement to said nipple means upwardly with respect to said compliance guide to an extreme upper position, signal conveyance means connected to said sensing means and being connectable to said robot assembly for conveying a shut-off signal to said robot assembly to shut off said robot assembly in response to said sensing means sensing movement of said nipple means to said extreme upper position.

6. A tool according to claim 1 comprising a cylindrical bushing fitted within said cylindrical bore of said compliance guide, said cylindrical bushing having a cylindrical opening extending therethrough, said holder body being slidably fitted within said cylindrical opening of said bushing for longitudinal reciprocating sliding movement therein.

7. A tool according to claim 1 wherein said stop means is adjustably mounted to said nipple means for selective adjustable movement to a plurality of positions along the length of said nipple means.

8. A tool according to claim 7 wherein said stop means is threadably mounted to said nipple means.

9. A tool according to claim 1 wherein said lower end of said nipple means is threadably received within said upper passageway end of said holder body.

10. A tool according to claim 1 wherein said cylindrical bore of said compliance housing has a cylindrical axis, said holder body being fitted within said cylindrical bore in such a manner as to minimize movement of said holder body in any direction relative to said compliance housing other than a direction coinciding with the direction of said cyindrical axis.

* * * * *